(12) United States Patent
Giladi

(10) Patent No.: US 11,582,495 B2
(45) Date of Patent: Feb. 14, 2023

(54) MEDIA PRESENTATION DESCRIPTION

(71) Applicant: InterDigital Patent Holdings, Inc., Wilmington, DE (US)

(72) Inventor: Alexander Giladi, Princeton, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 16/153,144

(22) Filed: Oct. 5, 2018

(65) Prior Publication Data

US 2019/0045235 A1 Feb. 7, 2019

Related U.S. Application Data

(63) Continuation of application No. 15/100,070, filed as application No. PCT/US2014/067647 on Nov. 26, 2014, now abandoned.

(60) Provisional application No. 62/062,734, filed on Oct. 10, 2014, provisional application No. 61/910,007, filed on Nov. 27, 2013.

(51) Int. Cl.
| | |
|---|---|
| *H04N 21/235* | (2011.01) |
| *H04N 9/82* | (2006.01) |
| *H04N 21/234* | (2011.01) |
| *H04N 21/81* | (2011.01) |
| *H04N 21/4335* | (2011.01) |
| *H04N 21/44* | (2011.01) |

(52) U.S. Cl.
CPC ....... *H04N 21/2353* (2013.01); *H04N 9/8205* (2013.01); *H04N 21/23424* (2013.01); *H04N 21/4335* (2013.01); *H04N 21/44004* (2013.01); *H04N 21/812* (2013.01)

(58) Field of Classification Search
None
See application file for complete search history.

(56) References Cited

U.S. PATENT DOCUMENTS

| 5,956,196 A | 9/1999 | Hull et al. |
| 6,272,566 B1 | 8/2001 | Craft |
| (Continued) | | |

FOREIGN PATENT DOCUMENTS

| AU | 2014354766 B2 | 3/2018 |
| CN | 1783881 A | 6/2006 |
| (Continued) | | |

OTHER PUBLICATIONS

AD-IDS, LLC, "Ad-ID Structure", Available at http://www.ad-id.org/how-it-works/ad-id-structure, 2014, 3 pages.

(Continued)

*Primary Examiner* — Jason K Lin
(74) *Attorney, Agent, or Firm* — Condo Roccia Koptiw LLP

(57) ABSTRACT

A method for indicating repeat occurrences of advertisements in media content may include one or more of the following. The method may include inserting a first descriptor element for a media content in a media presentation description (MPD) associated with the media content. The method may include inserting a second descriptor element for a repeat occurrence of the media content in the MPD. The second descriptor element may indicate that, during the repeat occurrence of the media content, the media content be presented from the beginning.

8 Claims, 13 Drawing Sheets

(56) References Cited

U.S. PATENT DOCUMENTS

| | | |
|---|---|---|
| 7,415,652 B1 | 8/2008 | Szeremi |
| 8,533,357 B2 | 9/2013 | Wolf et al. |
| 9,131,261 B2 | 9/2015 | Ajitomi et al. |
| 2002/0021629 A1 | 2/2002 | Hitotsui |
| 2002/0191950 A1 | 12/2002 | Wang |
| 2004/0006575 A1 | 1/2004 | Visharam et al. |
| 2005/0123042 A1 | 6/2005 | Park |
| 2006/0133427 A1 | 6/2006 | Wolf et al. |
| 2007/0040934 A1 | 2/2007 | Ramaswamy et al. |
| 2007/0223483 A1 | 9/2007 | Huang et al. |
| 2011/0040838 A1* | 2/2011 | Damarla ............... H04L 51/38 709/206 |
| 2011/0239078 A1 | 9/2011 | Luby et al. |
| 2012/0047542 A1 | 2/2012 | Lewis et al. |
| 2012/0173569 A1* | 7/2012 | Baxter ............... G06F 40/143 707/769 |
| 2012/0192231 A1* | 7/2012 | Maa ............... G06F 3/0219 725/38 |
| 2012/0303766 A1 | 11/2012 | McGowan et al. |
| 2013/0091251 A1 | 4/2013 | Walker et al. |
| 2013/0117413 A1 | 5/2013 | Kaneko et al. |
| 2013/0124749 A1 | 5/2013 | Thang et al. |
| 2013/0185398 A1 | 7/2013 | Thang et al. |
| 2013/0246643 A1* | 9/2013 | Luby ............... H04N 21/8455 709/231 |
| 2013/0262567 A1* | 10/2013 | Walker ............... H04L 69/329 709/203 |
| 2013/0268761 A1 | 10/2013 | Giladi |
| 2013/0290698 A1 | 10/2013 | Giladi et al. |
| 2014/0068648 A1 | 3/2014 | Green et al. |
| 2014/0074988 A1 | 3/2014 | Parekh |
| 2014/0149210 A1 | 5/2014 | Ma et al. |
| 2014/0150044 A1 | 5/2014 | Takahashi et al. |
| 2014/0173018 A1* | 6/2014 | Westphal ............ H04L 41/0823 709/213 |
| 2014/0201335 A1* | 7/2014 | Wang ............... H04L 65/80 709/219 |
| 2015/0131444 A1* | 5/2015 | Malatack ............ H04M 7/0024 370/235 |
| 2015/0206177 A1* | 7/2015 | Yao ............... G06Q 30/0246 705/14.45 |
| 2015/0296274 A1* | 10/2015 | Good ............... H04N 21/84 725/93 |
| 2015/0350205 A1 | 12/2015 | Oyman |
| 2016/0057467 A1 | 2/2016 | Yamagishi et al. |
| 2016/0072637 A1* | 3/2016 | Gholmieh ........... H04L 65/4076 709/219 |
| 2019/0045235 A1 | 2/2019 | Giladi |

FOREIGN PATENT DOCUMENTS

| | | |
|---|---|---|
| CN | 103181186 A | 6/2013 |
| EP | 1667404 A1 | 6/2006 |
| JP | 2004-348202 A | 12/2004 |
| JP | 2005-176352 A | 6/2005 |
| JP | 2006-190263 A | 7/2006 |
| JP | 2008-258790 A | 10/2008 |
| JP | 2011-199567 A | 10/2011 |
| JP | 2013-021574 A | 1/2013 |
| JP | 2013-115592 A | 6/2013 |
| JP | 2015-527795 A | 9/2015 |
| KR | 10-2011-0035647 A | 4/2011 |
| WO | WO 2000/016544 A2 | 3/2000 |
| WO | WO 2009063317 A2 | 5/2009 |
| WO | 2012/021538 A1 | 2/2012 |
| WO | WO 2013/044025 A2 | 3/2013 |
| WO | WO 2013/052780 A1 | 4/2013 |
| WO | 2013/152326 A1 | 10/2013 |
| WO | 2013/163448 A1 | 10/2013 |
| WO | WO 2013/163224 A1 | 10/2013 |
| WO | WO 2013/163477 A1 | 10/2013 |
| WO | WO 2014/011584 A1 | 1/2014 |
| WO | 2014/171473 A1 | 10/2014 |
| WO | 2015/081218 A1 | 6/2015 |

OTHER PUBLICATIONS

EIDR, "EIDR: ID Format", Version: 1.1, Aug. 19, 2013, 11 pages.
Interactive Advertising Bureau, "Video Ad Serving Template (VAST)", Version 3.0, Jul. 19, 2012, 71 pages.
Interactive Advertising Bureau, "Video Multiple Ad Playlist (VMAP)", Version 1.0, Jul. 19, 2012, 18 pages.
ISO/IEC, "Information Technology-Dynamic Adaptive Streaming over HTTP (DASH)—Part 1: Media Presentation Description and Segment Formats", ISO/IEC FDIS 23009-1:2013(E), Aug. 2, 2013, 150 pages.
ISO/IEC, "Information Technology-Dynamic Adaptive Streaming over HTTP (DASH)—Part 1: Media Presentation Description and Segment Formats", ISO/IEC 23009-1:2014 (E), 2nd Edition, May 15, 2014, 152 pages.
Movielabs, "Common Metadata 'md' Namespace", Motion Picture Laboratories, Inc., TR-META-CM, Version: 2.0, Jan. 3, 2013, 81 pages.
SCTE, "Digital Program Insertion Cueing Message for Cable", ANSI/SCTE 35 2013, 2013, 45 pages.
SCTE, "Digital Program Insertion Cueing Message for Cable", SCTE 35 2014, Engineering Committee, Digital Video Subcommittee, 2014, 67 pages.
Sodagar, Iraj, "The MPEG-DASH Standard for Multimedia Streaming Over the Internet", IEEE, vol. 18, No. 4, Dec. 31, 2011, pp. 62-67.
JP 2004-348202 A, Cited in Office Action dated Feb. 26, 2020, in related Korean Patent Application No. 10-2018-7012174.
JP 2011-199567 A, Cited in Office Action dated Jul. 30, 2019, in related Japanese Patent Application No. 2018-220398.
"Vol. 5—Declarative Application Environment", Open IPTV—Release 1 Specification V1.0, Jan. 5, 2009, pp. 1-4.
Dash Industry Forum, "Guidelines for Implementation: Ad Insertion in DASH", Version 1.0, Oct. 4, 2016, 167 pages.
Stockhammer, "MPEG's Dynamic Adaptive Streaming over HTTP (Dash)—Enabling Formats for Video Streaming over the Open Internet", Qualcomm Incorporated, Webinar at EBU, Nov. 22, 2011, pp. 1-54.
CN 1783881 A, US 2006/0133427 A1 (Previously cited in Information Disclosure Statement filed on May 8, 2020 in the above-identified U.S. Appl. No. 16/153,144).
Dash Industry Forum, "Guidelines for Implementation: Ad Insertion in DASH", Version 0.5, Jul. 29, 2014, 32 pages.

* cited by examiner

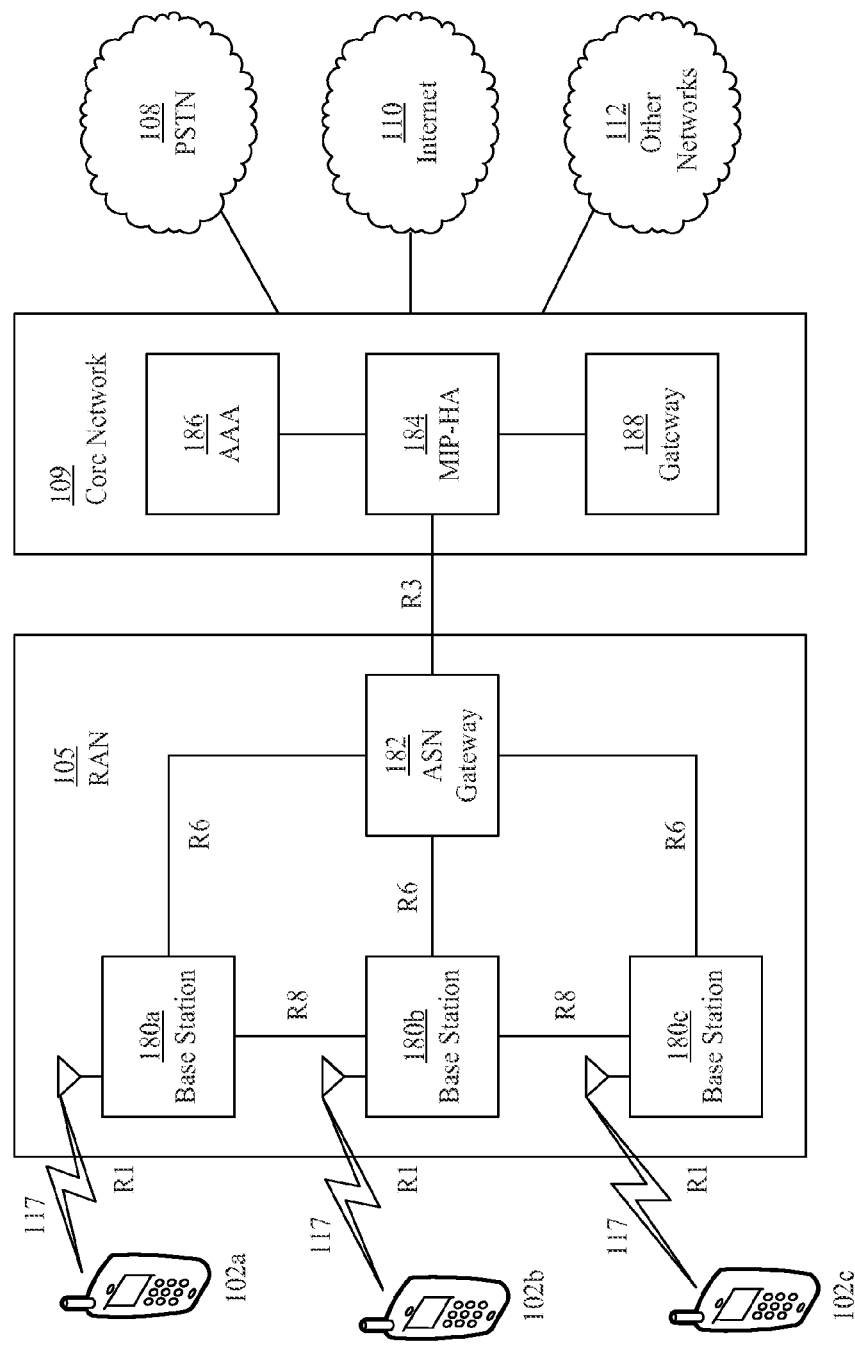

MEDIA PRESENTATION DESCRIPTION

CROSS-REFERENCE TO RELATED APPLICATIONS

This application is a continuation of U.S. patent application Ser. No. 15/100,070, filed May 27, 2016, which is the National Stage Entry under 35 U.S.C. § 371 of Patent Cooperation Treaty Application No. PCT/US2014/067647, filed Nov. 26, 2014, which claims priority to U.S. provisional patent application no. 61/910,007, filed Nov. 27, 2013, and to U.S. provisional patent application no. 62/062,734, filed Oct. 10, 2014, all of which are incorporated herein by reference in their entirety.

BACKGROUND

Television has been used to present media content, for example advertisements. Media content may also be presented through a computing device, for example a personal computer, a tablet computers, or a smartphone. A computing device may present the media content through a browser or through an application. The computing device may download the media content, either partially or entirely, before presenting the media content. The computing device may stream the media content. The media content may include one or more advertisements. The advertisements may be selected based on the media content being presented. The advertisements may be selected based on a user profile associated with the computing device.

Advertising may occur during breaks over the duration of a show. Advertising rates may be determined by a media content rating system, for example the Nielsen ratings. Media content distributors may distribute content to local affiliates and cable television providers nationwide. Media content may be distributed as video streams that may be rendered, for example, by a digital television system or a video on demand (VOD) system. The video streams may carry advertisements that may be shown at the national level, but that may also allow for regional and/or local advertisements to be inserted in the stream.

SUMMARY

A method may include one or more of the following. The method may include inserting a first descriptor element for a media content in a media presentation description (MPD) associated with the media content. The method may include inserting a second descriptor element for a repeat occurrence of the media content in the MPD. The second descriptor element may indicate that, during the repeat occurrence of the media content, the media content be presented from the beginning.

Inserting the first descriptor element may include inserting a media content identifier that identifies the media content. Inserting the first descriptor element may include inserting a first occurrence identifier that identifies a first occurrence of the media content. Inserting the second descriptor element may include inserting a second occurrence identifier that identifies a second occurrence of the media content.

The first descriptor element may indicate a placement of the media content in a media stream. The second descriptor element may indicate a placement of the repeat occurrence of the media content in the media stream. The second descriptor element may include an AssetIdentifier descriptor element.

The method may include receiving the MPD from a network entity over a communication network. The method may include sending the MPD to a media playback client. The sent MPD may include the first descriptor element and the second descriptor element. The media content may include an advertisement.

The MPD may include a first version of the MPD and a second version of the MPD. The first descriptor element may be inserted in the first version of the MPD. The second descriptor element may be inserted in the second version of the MPD.

A method may include one or more of the following. The method may include inserting an advertisement identifier in a MPD. The advertisement identifier may identify an advertisement. The method may include inserting a first occurrence identifier in the MPD. The first occurrence identifier may identify a first occurrence of the advertisement in a media stream. The method may include inserting a second occurrence identifier in the MPD. The second occurrence identifier may identify a second occurrence of the advertisement in the media stream. The second occurrence identifier may indicate that, during the second occurrence of the advertisement in the media stream, the advertisement be played from the beginning.

The advertisement identifier and the first occurrence identifier may be inserted in a first descriptor element associated with the first occurrence of the advertisement. The advertisement identifier and the second occurrence identifier are inserted in a second descriptor element associated with the second occurrence of the advertisement.

A method for presenting media may include one or more of the following. The method may include receiving a first descriptor element in a MPD. The first descriptor element may be for a first occurrence of an advertisement in a media stream. The first descriptor element may include an advertisement identifier and a first occurrence identifier that may identify the first occurrence the advertisement. The method may include receiving a second descriptor element in the MPD. The second descriptor element may be for a second occurrence of the advertisement in the media stream. The second descriptor element may include the advertisement identifier and a second occurrence identifier that may identify the second occurrence of the advertisement. The method may include playing the advertisement from the beginning during the second occurrence of the advertisement in the media stream.

A method may include one or more of the following. The method may include providing a plurality of period elements in a media presentation description (MPD) for a MPEG-DASH media asset. The method may include inserting a descriptor element in a period element of the plurality of period elements to indicate a last period element corresponding with the MPEG-DASH media asset.

Inserting the descriptor element may include inserting a string that indicates the last period element corresponding with the MPEG-DASH media asset. The period element with the descriptor element may be the last period element corresponding with the MPEG-DASH media asset.

Providing the plurality of period elements may include generating the plurality of period elements. Providing the plurality of period elements may include receiving the plurality of period elements.

The method may include inserting a second descriptor element in a second period element of the plurality of period elements. The second descriptor element may indicate that the second period element is not the last period element associated with the MPEG-DASH media asset.

Inserting the descriptor element to indicate the last period element may include inserting an expected duration of the media asset in the descriptor element. Inserting the descriptor element to indicate the last period element may include inserting an expected end time of the media asset in the descriptor element.

The descriptor element may include a SupplementalProperty descriptor element. The media asset may include a live broadcast. The method may include sending the plurality of period elements to a media playback client over a communication network.

A method may include one or more of the following. The method may include receiving a period element corresponding with a MPEG-DASH media asset. The method may include determining whether the period element is the last period element associated with the media asset. The method may include managing a playback resource associated with the media asset based on determining whether the period element is the last period element associated with the media asset.

Determining whether the period element is the last period element may include determining whether the period element includes a descriptor element that may indicate that the period element is the last period element of the media asset. Managing the playback resource may include purging a playback buffer based on determining that the period element is the last period element associated with the media asset. Managing the playback resource may include maintaining a current state of a playback buffer based on determining that the period element is not the last period element.

One or more of the above methods may be implemented by a computing device. The computing device may include a processor. The processor may be configured to perform one or more of the above methods. The computing device may include a communication interface. The computing device may include an output interface.

A computing device may comprise a processor. The processor may be configured for one or more of the following. The processor may insert a first descriptor element for a media content in a media presentation description (MPD) associated with the media content. The processor may insert a second descriptor element for a repeat occurrence of the media content in the MPD. The second descriptor element may indicate that, during the repeat occurrence of the media content, the media content be presented from the beginning.

The processor may be configured to insert the first descriptor element by inserting a media content identifier that identifies the media content and inserting a first occurrence identifier that identifies a first occurrence of the media content. The processor may be configured to insert the second descriptor element by inserting a second occurrence identifier that may identify a second occurrence of the media content.

A computing device may comprise a processor. The processor may be configured for one or more of the following. The processor may insert, in a media presentation description (MPD), an advertisement identifier that identifies an advertisement. The processor may insert, in the MPD, a first occurrence identifier that identifies a first occurrence of the advertisement in a media stream. The processor may insert, in the MPD, a second occurrence identifier that identifies a second occurrence of the advertisement in the media stream.

The second occurrence identifier may indicate that, during the second occurrence of the advertisement in the media stream, the advertisement be played from the beginning. The advertisement identifier and the first occurrence identifier may be inserted in a first descriptor element associated with the first occurrence of the advertisement. The advertisement identifier and the second occurrence identifier may be inserted in a second descriptor element associated with the second occurrence of the advertisement.

A computing device may comprise a communication interface and a processor. The processor may be configured for one or more of the following. The processor may receive, in a media presentation description (MPD), a first descriptor element for a first occurrence of an advertisement in a media stream. The first descriptor element may comprise an advertisement identifier and a first occurrence identifier that may identify the first occurrence the advertisement. The processor may receive, in the MPD, a second descriptor element for a second occurrence of the advertisement in the media stream. The second descriptor element may comprise the advertisement identifier and a second occurrence identifier that may identify the second occurrence of the advertisement. The computing device may comprise a display. The processor may be configured to play the advertisement from the beginning during the second occurrence of the advertisement in the media stream.

A computing device may comprise a processor. The processor may be configured to provide a plurality of period elements in a media presentation description (MPD) for a MPEG-DASH media asset. The processor may insert a descriptor element in a period element of the plurality of period elements to indicate a last period element corresponding with the MPEG-DASH media asset.

The processor may be configured to insert the descriptor element by inserting a string that indicates the last period element corresponding with the MPEG-DASH media asset. The period element may be the last period element corresponding with the MPEG-DASH media asset. The processor may be configured to provide the plurality of period elements by generating the plurality of period elements. The processor may be configured to provide the plurality of period elements by receiving the plurality of period elements.

A computing device may comprise a communication interface and a processor. The processor may be configured for one or more of the following. The processor may receive a period element corresponding with a MPEG-DASH media asset. The processor may determine whether the period element is the last period element associated with the media asset. The processor may manage a playback resource associated with the media asset based on determining whether the period element is the last period element associated with the media asset.

The processor may be configured to determine whether the period element is the last period element by determining whether the period element includes a descriptor element that indicates that the period element is the last period element of the media asset. The processor may be configured to manage the playback resource by purging a playback buffer based on determining that the period element is the last period element associated with the media asset. The processor may be configured to manage the playback resource by maintaining a current state of a playback buffer based on determining that the period element is not the last period element.

BRIEF DESCRIPTION OF THE DRAWINGS

FIG. 1E is a system diagram of another example radio access network and another example core network that may be used within the communications system illustrated in FIG. 1A.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
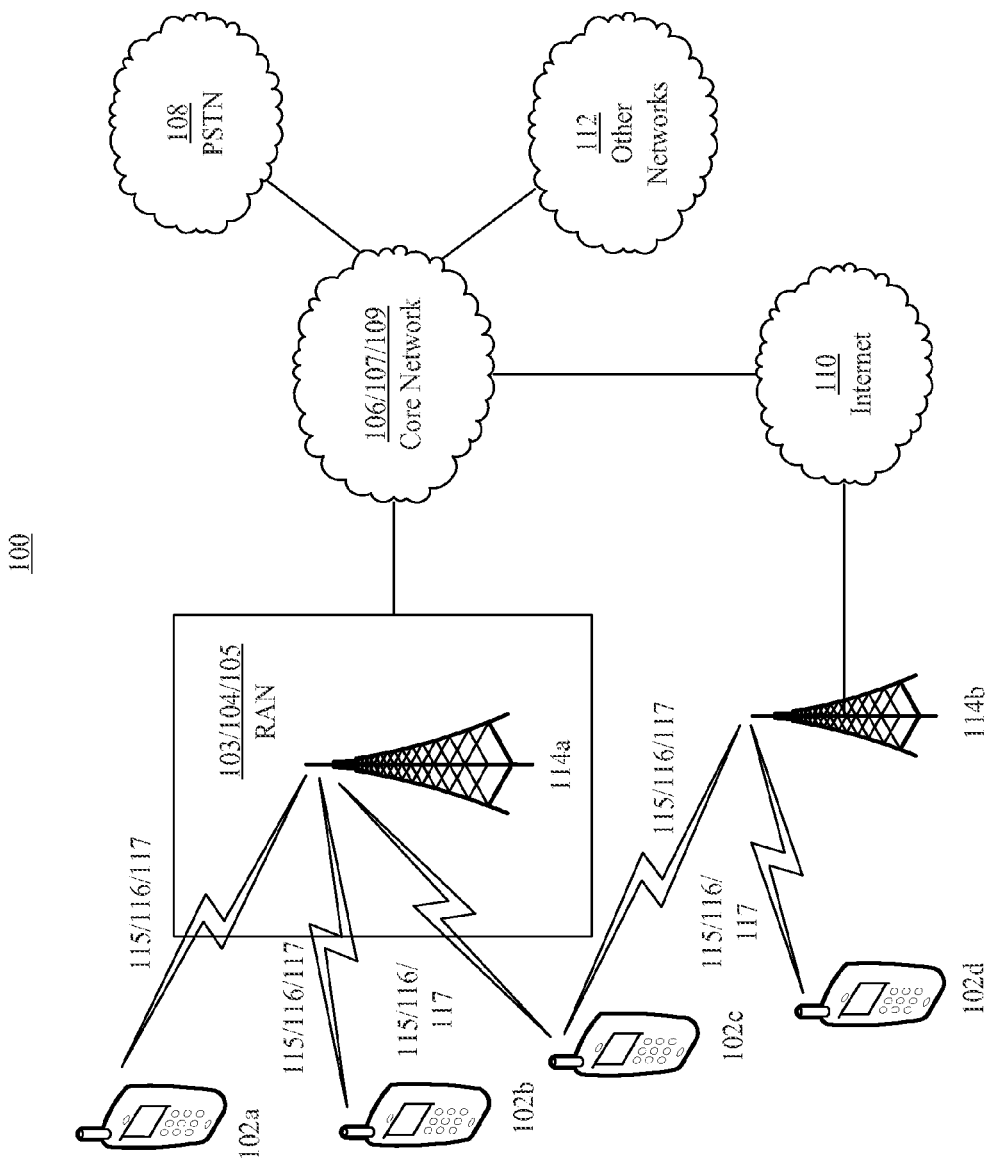
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a. 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b. 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B. or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c and 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
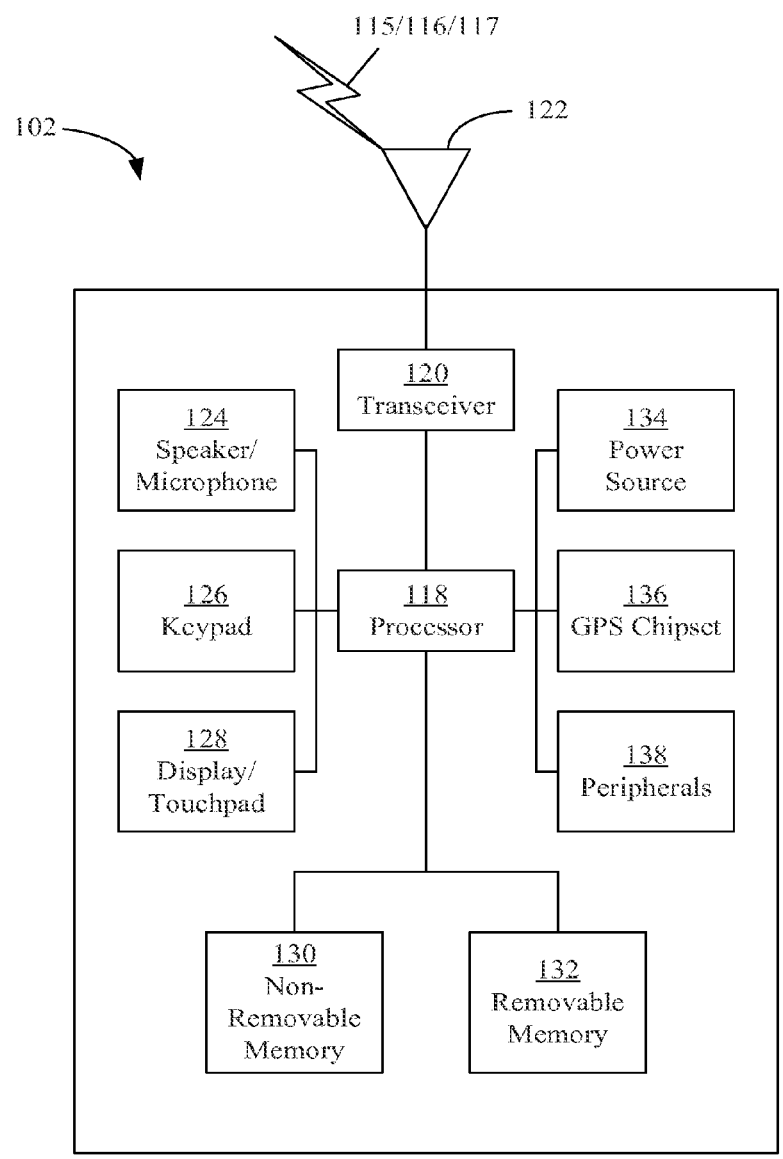
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
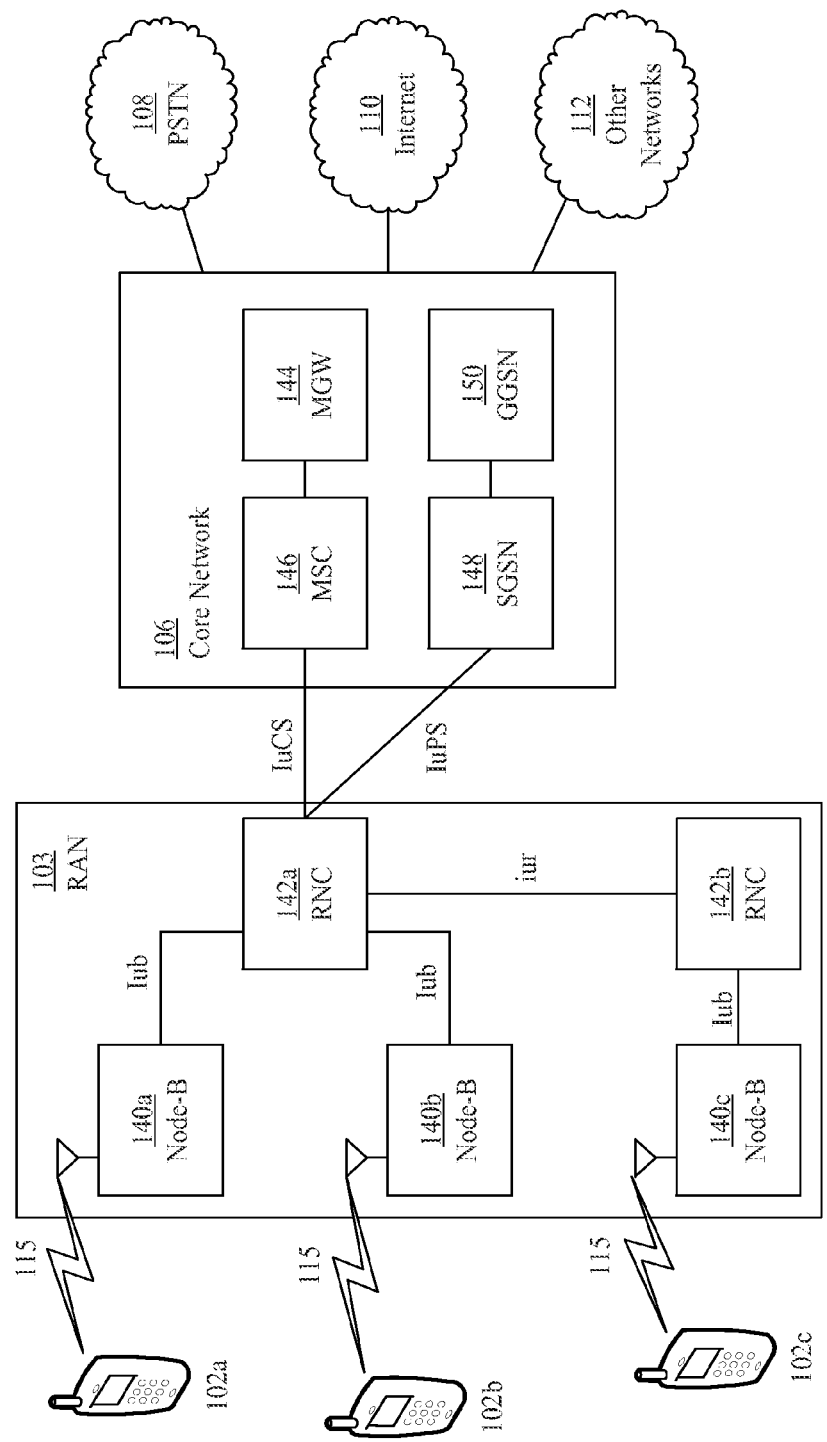
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102u, 102b, and 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
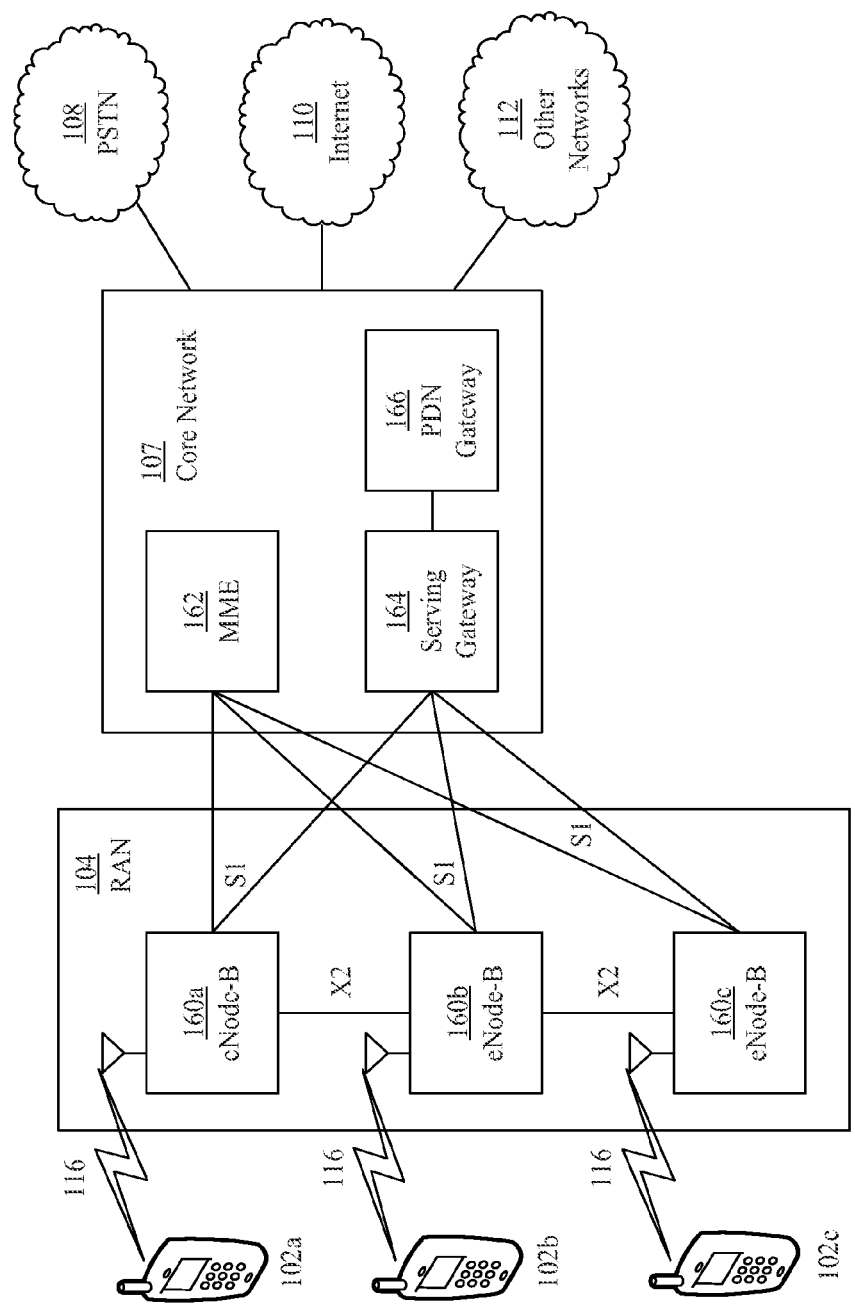
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b. 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b. 102c and traditional land-line communications devices. In addition, the gateway 188 may provide the WTRUs 102a, 102b. 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a. 102b, 102c between the RAN 105 and the other ASNs. The communication link between the core network 109 and the other core networks may be defined as an R5 reference, which may include protocols for facilitating interworking between home core networks and visited core networks.

The subject matter disclosed herein may be used in multimedia delivery systems for mobile devices (e.g., smart phones, tablets, laptops) and home devices such as set-top boxes, streaming devices, gaming consoles, consumer/commercial TVs and SmartTVs, and personal computers. Multimedia delivery frameworks including, but not limited to, cable, IPTV, progressive download, streaming technologies, and bandwidth adaptive streaming may be supported.

A system for multimedia delivery system may use information about a user's viewing conditions to adapt an encoding and delivery process to reduce or minimize usage of network bandwidth, power, and other system resources. The system may use sensors (e.g., front-faced camera, ambient light sensor, accelerometer, etc.) of a device (e.g., smart phone or tablet) to detect the presence of the viewer. An adaptation system may use this information to determine parameters of visual content that a viewer may be able to see and may adjust encoding and delivery options accordingly. This adaptation mechanism may allow the delivery system to achieve a satisfactory user experience, while saving network bandwidth and other system resources. A system may detect and adapt to user presence using sensors such as an 1R remote control, range finder, TV camera; smart phone or tablets used as remote controls and second screens; and capabilities that may be available at home.

Figure 2:
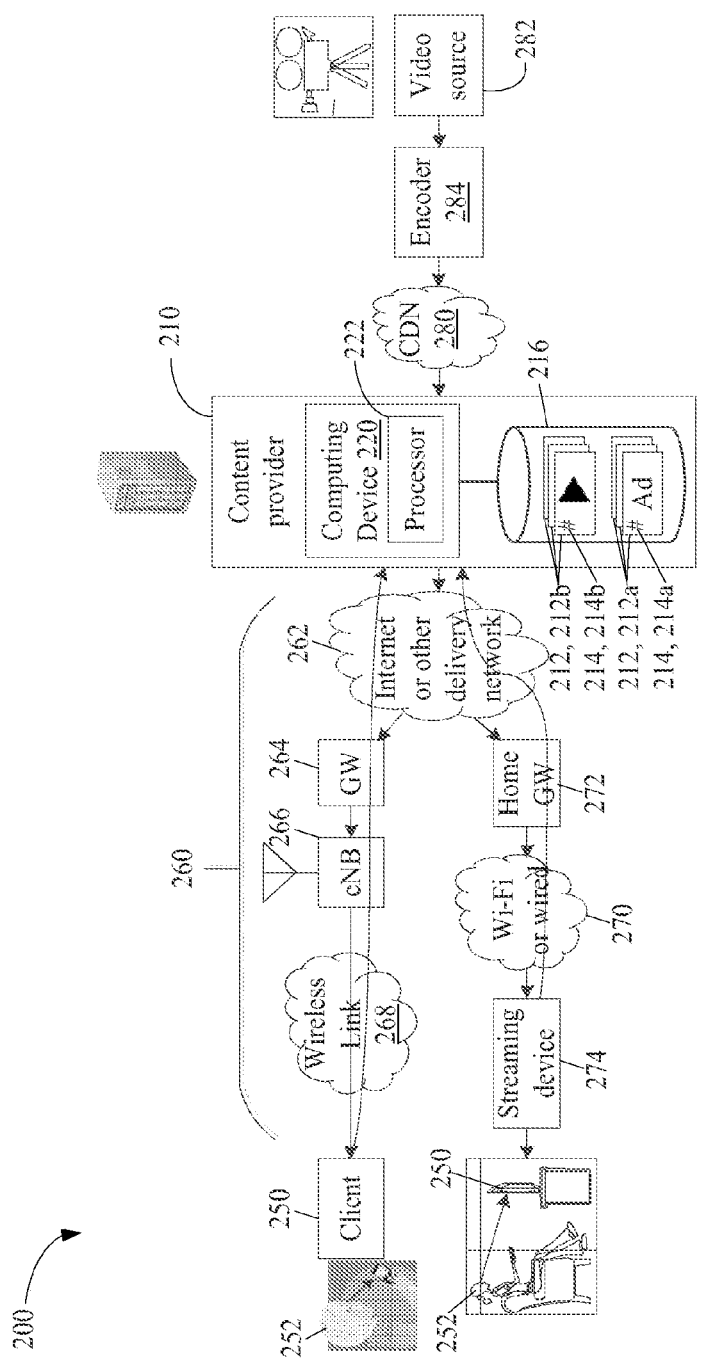
FIG. 2 illustrates an example bandwidth-adaptive multimedia system for delivering content.

FIG. 2 illustrates an example multimedia system 200 that may be used for delivering media content. The system 200 may be bandwidth-adaptive. The multimedia system 200 may include a content provider 210, a client 250 and a communication network 260. The content provider 210 may send media content (e.g., multimedia content) to the client 250 over the communication network 260.

The content provider 210 may store media content 212. The media content 212 may comprise an advertisement 212a and/or non-advertising media content 212b. The non-advertising media content 212b may be, for example, a movie, a show, etc. The media content 212 may include a media content identifier 214 that may identify the media content 212. The media content identifier 214 may include an advertisement identifier 214a that may identify an advertisement 212a. The media content identifier 214 may include a media content identifier 214b that may identify the non-advertising media content 212b.

The content provider 210 may store the media content 212 in a data store 216. The data store 216 may include an advertisement data store that may store advertisement(s) 212a. The data store 216 may include a non-advertising media content data store that may store the non-advertising media content 212b. The content provider 210 may include a computing device 220. The computing device 220 may include one or more servers. The computing device 220 may include a processor 222. The processor 222 may be configured to do one or more of the following. The processor 222 may access the data store 216. The processor 222 may retrieve media content 212 from the data store 216 and provide the media content 212 to the client 250.

A user 252 may control the client 250. An example of the client 250 may be a WTRU (e.g., WTRU 102). The user 252 may, for example, request a particular media content 212 from the content provider 210. The user 252 may purchase the media content 212 from the content provider 210. The user 252 may provide payment information, for example, credit card information, to the content provider 210 via the client 250. The communication network 260 may include the Internet 262. The communication network 260 may include a cellular communication network. The cellular communication network may include a gateway 264. The cellular communication network may include a base station, for example an eNodeB 266. The cellular communication network may include a wireless link 268. The communication network 260 may include a Wi-Fi network 270. The communication network 260 may include a home gateway 272. The communication network 260 may include a streaming device 274.

The system 200 may include a content distribution network 280. The content provider 210 may receive the media content 212 via the content distribution network 280. A content source 282 (e.g., a video source, for example a camera) may capture media content (e.g., video, audio, or both). An encoder 284 may encode the media content captured by the content source 282. The encoder 284 may send the encoded media content to the content provider 210 through the content distribution network 280. The content provider 210 may receive media content from the content source 282 via the content distribution network 280. The content provider 210 may store the received media content in the data store 216.

User presence, proximity to screen, and attention to video content may be established, for example, using built-in sensors (e.g., a camera accelerometer) in mobile devices or built-in sensors in a TV, a set-top box, a remote control, or other TV-attached devices (e.g., game consoles, Kinect, and the like) in a home environment. Information about user presence and proximity may be used to optimize multimedia delivery. For example, information regarding the presence of the user 252 and/or proximity of the user 252 to the client 250 may be used (e.g., by the client 250 or by the content provider 210) to optimize the delivery of the media content 212 on the client 250.

Content distributors (e.g., content provider 210) may distribute content (e.g., media content 212) to local affiliates and cable television providers nationwide. Content may be distributed as video streams that may be rendered, for example, by a digital television system (e.g., client 250) or a video on demand (VOD) system. The video streams may carry advertisements (e.g., advertisements 212a) that may be shown at the national level, but that may also allow for regional and/or local advertisements to be inserted in a media stream (e.g., in between non-advertising media content 212b). In analog television, in-band dual-tone multi-frequency (DTMF) subcarrier audio cue tones may be used to trigger a cutover from a show or national advertisement to a regional or local advertisement. Cue messages may be embedded in MPEG-2 TS.

Figure 3:
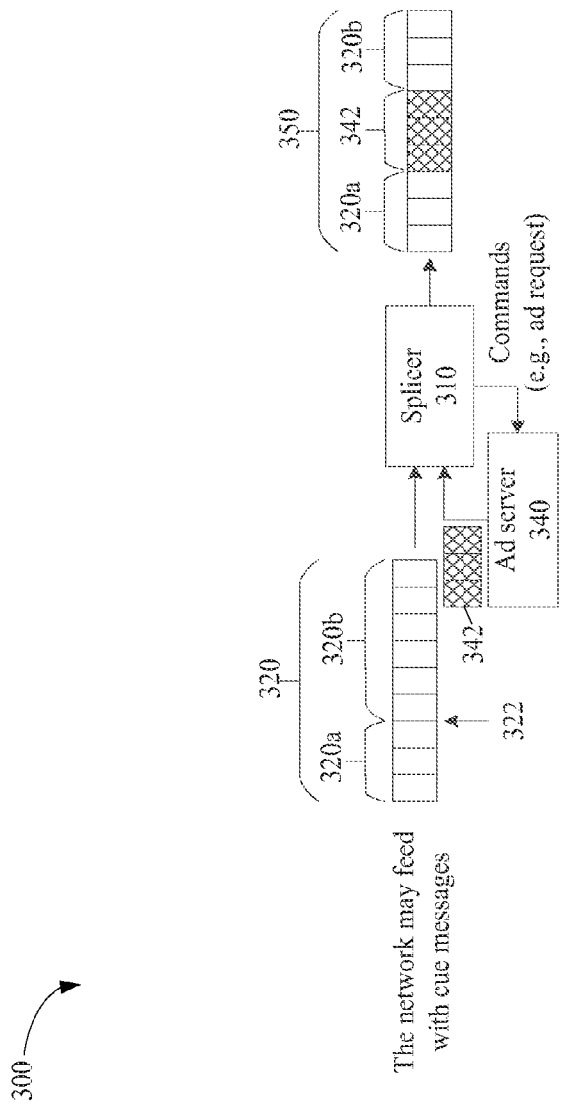
FIG. 3 illustrates an example operation of a splicing server.

One or more advertisement splicers may scan incoming content for messages (e.g., cue messages). The advertisement splicer may query an advertising decision server for an advertisement or advertisements that may be displayed. The advertisement splicer may insert the advertisement(s) into the media content that reaches the viewer. FIG. 3 illustrates an example system 300 that may be used for inserting or splicing advertisements in a media stream. The system 300 may include an advertisement splicer 310. The advertisement splicer 310 may receive a network feed 320. The network feed 320 may include a media stream. For example, the network feed 320 may include non-advertising media content(s) 212b. The network feed 320 may include one or more cue messages. A cue message may indicate a position 322 (e.g., an insertion point) within the network feed 320 where an advertisement may be inserted. The cue message may indicate a type of the advertisement. The cue message may indicate a particular advertisement that may be inserted in the network feed 320, e.g., the cue message may specify a particular advertisement identifier 214a.

The system 300 may include an advertisement server 340 (e.g., data store 216). The advertisement server 340 may include one or more advertisements 342 (e.g., advertisements 212a). The advertisement splicer 310 may be configured for one or more of the following. The advertisement splicer 310 may be configured to receive the network feed 320. The advertisement splicer 310 may scan the network feed 320 for one or more cue messages. The advertisement splicer 310 may identify a position 322 within the network feed 320 where the advertisement splicer 310 may insert an advertisement 342. The advertisement splicer 310 may access the advertisement server 340. The advertisement splicer 310 may retrieve the advertisement 342 from the advertisement server 340. The advertisement splicer 310 may insert the advertisement 342 in the network feed 320 at the position 322 that is indicated by the cue message. The advertisement splicer 310 may output a modified network feed 350. The modified network feed 350 may include a first portion 320a of the network feed 320, the inserted advertisement 342 and a second portion 320b of the network feed 320. The advertisement splicer 310 may send the modified network feed 350 to another network entity, for example to the client 250 and/or to the content provider 210, etc.

The system 300 may be implemented, either entirely or partially, by the content provider 210. The system 300 may be implemented by different network entities. For example, the advertisement server 340 may be implemented by the content provider 210. The advertisement 342 may include the advertisement 212a. The network feed 320 may include non-advertising media content(s) 212b. The system 300 and/or the advertisement splicer 310 may be implemented by a computing device (e.g., computing device 220). The computing device may have a processor (e.g., processor 222) that may be configured to implement the advertisement splicer 310.

Web sites hosting media content (e.g., YouTube, Hulu, Facebook, CBS, Yahoo, etc.) may obtain revenue by showing advertisements to users during a multimedia delivery session (e.g., progressive download or streaming). Ads may be shown at the beginning (pre-roll), end (post-roll), and/or during (mid-roll) of the delivery session. When a video advertisement is rendered, rules may be inserted to alter the user's control of the playback. For example, users may be prevented from skipping or fast-forwarding through the ad.

Advertisers may compensate web publishers for inserting ads in their content. In a Cost Per Mille (CPM) model, for example, advertisers may pay for every thousand displays of their message to potential customers. Each instance when an advertisement is displayed may be referred to as an impression. Accuracy of counting and/or verifying impressions may be performed. If an impression is verified as one that was watched by the viewer it may be worth more than an impression that is not verifiable as having reached a viewer's attention. Other compensation models include Cost Per Click (CPC) and Cost Per Action (CPA) models.

Advertisement verification techniques may relate to techniques related to image ads, such as but not limited to determining whether an advertisement has been served (e.g., using cookies or invisible or transparent images), whether the page with advertisements may have been requested by a human (e.g., to prevent fraud by inflating the number of impressions), and/or by determining the location of an advertisement within a web page (e.g., visible by the user on page load, referred to as "above the fold").

An IAB Video Ad Serving Template (VAST) may be used for advertisement tracking. Beyond tracking the fact that the first frame of the advertisement was displayed (e.g., an impression), a richer set of tracking events may be provided (e.g., percentage of the advertisement reached, mute/unmute, and the like). These events may trigger requests, such as HTTP GET requests, to URLs specified in the advertisement server response expressed in VAST. SCTE 35 may be used for advertisement insertion in adaptive streaming, for example, in a binary format or in an XML format.

Advertisement impressions may not be verified directly if there may be no built-in feedback mechanism in the content delivery system, for example, as may be the case in broadcast and cable TV. Ads may be served when a user is active and a user's presence may be determined by using the mouse or the keyboard, for example, as may be the case in video streaming for laptops and PCs with an Internet connection.

Targeted advertising may involve placing advertisements so as to reach consumers based on various traits such as, for example, demographics, psychographics, behavioral variables (e.g., product purchase history), and/or other second-order activities that may serve as a proxy for these consumer traits.

Targeted media advertising may use second-order proxies for targeting. For example, targeted advertising may track online or mobile web activities of consumers, associate historical webpage consumer demographics with new consumer web page access, and/or use a search word as the basis for implied interest or contextual advertising.

Addressable advertising systems may serve ads (e.g., directly serve ads) based on demographic, psychographic, and/or behavioral attributes associated with the consumer(s) exposed to the advertisement. These systems may be digital and may be addressable in that the end point that serves the advertisement (e.g., set-top box, website, or digital sign) may render an advertisement independently of any other end points based on consumer attributes specific to that end point at the time the advertisement may be served. Addressable advertising systems may use consumer traits associated with the end points as the basis for selecting and serving ads.

Targeted advertisements may be more valuable than network wide ads, and the specificity with which the targeting is performed may be important. Age may be estimated from facial still images. Other anthropometric parameters, such as race, ethnicity, etc., may be estimated. These techniques may rely on image data as an input in order to estimate demographic/anthropometric parameters.

Other sensor inputs, such as accelerometers, gyroscopes, IR cameras, etc., may be used to estimate age and/or other demographic information. Accelerometers, e.g., in a smart phone, may be used to monitor a user's essential physiological kinetic tremor, which may have characteristics that may correlate to age. Other sensors (e.g., gyroscope) may also be used to obtain or complement this information. For additional demographic data, the accelerometer data may be mined for gender, height, and weight.

Advertising may be inserted in a video stream using, for example, an application-driven architecture or a server-driven architecture. A server-driven architecture may use a client (e.g., a DASH client), and communication with advertising decision services may be performed at the server side. Communication may be triggered by a client request for a segment, a remote element, or an media presentation description (MPD). An application-driven architecture may use an application running on a wireless transmit/receive unit (WTRU) that may control one or more DASH clients.

A server-driven architecture may assume DASH functionality. An application-driven architecture may use an application that controls multiple DASH clients. For example, multiple client instances may execute on a client device for context switching. e.g., between main content and advertising or for another purpose.

Figure 4:
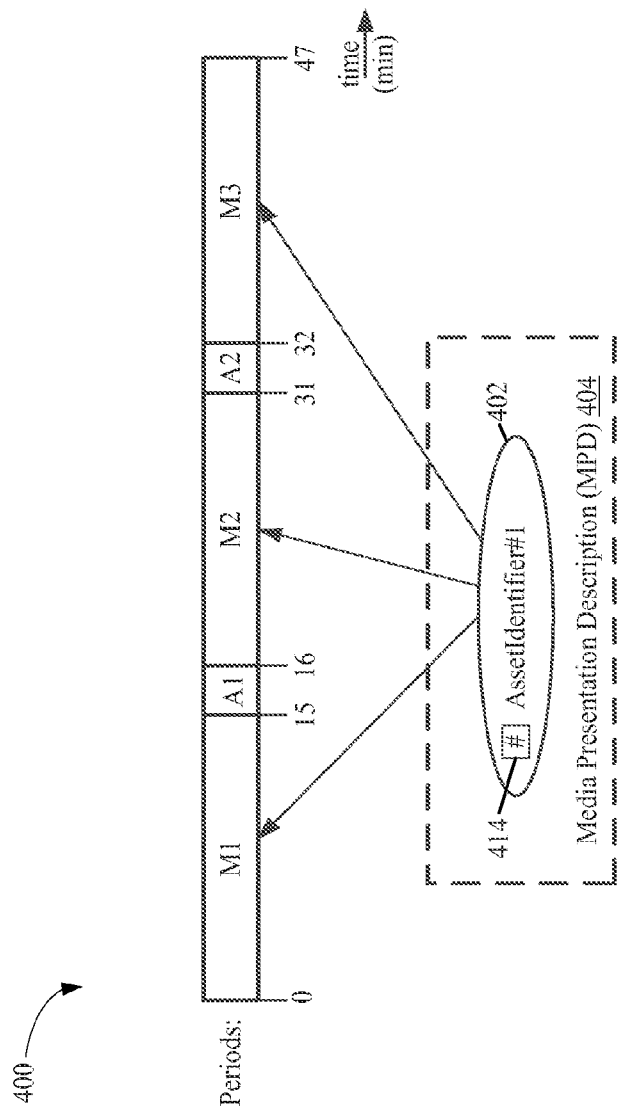
FIG. 4 illustrates an example presentation of media periods and advertisements.

FIG. 4 illustrates an example presentation sequence 400 of media content (e.g., media content 212). A descriptor element 402 may enable the presentation of multi-period assets (e.g., multi-period media content). An example of the descriptor element may be an AssetIdentifier. The descriptor element 402 may be included in a media presentation description (MPD) file 404. The descriptor element 402 may include a content identifier 414 that may identify the media content. An example of the media content may be the non-advertising media content 212b of FIG. 2. The content identifier 414 may identify the media content. An example of the content identifier may be the non-advertising media content identifier 214b. The descriptor element 402 may establish a media content specific (e.g., an asset-specific) timeline. Multi-period media content may be media content that may be split into several periods. For example, a 45-min movie may be separated into three 15-minute periods, M1, M2, and M3. Two 1-min ads, A1 and A2, may be inserted between the movie periods. The presentation may be the sequence 400 of five periods, M1, A1, M2, A2, and M3, as illustrated in FIG. 4.

A period (e.g., each period) may be associated with a descriptor element 402 that may identify the media content to which the period belongs. Using an equivalent descriptor element for M1, M2, and M3 may establish that these three periods belong to the same media content (e.g., a particular media content 212b that may include a 45 minute movie object). This description structure may be used to inform a media playback client (e.g., a DASH client or client 250) that a single content object may flow across periods M1, M2, and M3. M2 may be a continuation of M1, and M3 may be a continuation of M2.

The mapping of periods (e.g., periods M1. M2 and M3) to descriptor elements (e.g., descriptor element 402) may be used by a media playback client (e.g., client 250) to switch contexts appropriately between different media content at the proper times. The mapping of periods to descriptor elements may be used by a media playback client to properly display the playback progress bar (e.g., scrub bar), which may show the current playback position. The mapping of periods to descriptor elements may enable the media playback client to properly handle trick modes, such as seeking forward or backward within a media content.

The MPD 404 may be delivered to the media playback client (e.g., client 250). The MPD 404 may comprise a description of the periods M1, M2 and M3. The MPD 404 may specify an associated descriptor element for each period. For example, the MPD 404 may specify that the descriptor element 402 is associated with periods M1, M2 and M3. A media playback client may compare descriptor elements using an equivalence rule in order to determine whether the descriptor elements specified for different periods may be equivalent and may map to the same media content (e.g., media content 212, for example the 45 minute movie object). For example, two descriptor elements may be considered equivalent if the fields and/or payload associated with a first descriptor element matches the corresponding fields and/or payload of a second descriptor element. Whitespace characters may be ignored. The specific definition of equivalence may vary.

HTTP may be stateless and client-driven. Push-style events may be emulated using frequent polls. In cable/IPTV systems, upcoming advertisement breaks may be signaled, for example, three to eight seconds before their start. A straightforward poll-based implementation may be inefficient. Events may address such use cases.

Events may be blobs with explicit time and duration information and may include application-specific payloads. An application may subscribe to events of a certain type and handle them. This may be a sink, for example, the event processing model of the application may be completely opaque to the DASH client, and it may not expect any feedback regarding the event.

In-band events may refer to small message boxes that may appear at the beginning of media segments. MPD events may refer to a period-level list of timed elements. DASH may define MPD Validity Expiration and MPD Patch events. MPD Validity Expiration events may notify the client when a newly published MPD may become valid (and may be fetched). MPD Patch events may apply a patch to the current MPD. A DASH client may handle these events rather than pass them to an application.

DASH may define several template parameters. The template parameters may have pre-defined names and/or semantics. The template parameters may be used for URL creation. DASH may define generalized parameters. The generalized parameters may be used by the author to declare a variable in the MPD. The declared variable may be instantiated at MPD fetch time or in real time. An application may provide a value of the declared variable. The declared variable may be used to create the URL when templates are used. For example, one may declare a variable named '$UserIDS', instantiate '$UserIDS' at the beginning of a period and append a value of '$UserID$' to a segment request.

Advertisement insertion primitives may be mapped to DASH functionality. An advertisement may be a period element (e.g., period A1 or A2). An advertisement cue may be a remote period element. Main content (e.g., periods M1, M2 and M3, for example non-advertising media content 212b) may be distinguished from inserted content (e.g., periods A1 and A2, for example advertisements 212a) using descriptor elements. MPD updates may be used to notify a client of new periods, for example, using client-side polling (e.g., at a given frequency) or asynchronously using an Iseg brand and/or in-band events.

A hybrid approach may be provided. A hybrid approach may involve using generic DASH functionality for server-side advertisement insertion and using VAST embedded within DASH MPD events to provide integration with an advertising infrastructure for tracking, reporting, and companion advertising functionality.

HTTP GET requests may be logged. This approach may have issues, for example, related to establishing a notion of sessions and/or to the complexity of data aggregation across content delivery networks (CDNs).

Descriptor elements may be used to distinguish main content (e.g., non-advertising media content 212b, for example a movie) from inserted advertising content (e.g., advertisements 212a), for example, in MPEG DASH and/or 3GPP DASH systems. The descriptor element 404 may comprise a content identifier 414 (e.g., an identifier component, for example a string, etc.). The content identifier 414 may identify the media content. The content identifier 414 may include an advertisement identifier that may specify an advertisement, for example when the descriptor element includes the advertisement. For example, the descriptor element for a given video advertisement object may comprise an advertisement identifier. The advertisement identifier may include an Ad-ID that may be provided by a system, for example, at www.ad-id.org. The advertisement identifier may include a MovieLabs Content ID URN, or another identifier. This may enable the media playback client to identify an advertisement object, for example for functions such as retrieval, playback, and/or reporting. For example, the client 250 may use a value of the content identifier 414 (e.g., advertisement identifier 214a) to retrieve a corresponding advertisement 212a.

For example, the AssetIdentifier descriptor element may be as follows:
    <AssetIdentifier schemeIdUri="urn:org:dashif:ad-id:2013"
        value="md:cid:EIDR:10.5240%2fF592-58D1-A4D9-E968-5435-L"/>

The value attribute may include the content identifier 414 (e.g., a MovieLabs Content ID) that may identify the advertising content object (e.g., advertisement 212a).

The media content identifiers (e.g., media content identifiers 214 or identifier strings) that may be available for use in descriptor elements may identify a media content object (e.g., media content 212). The media content identifiers may not change with subsequent insertions or placements of the media content object. For example, an advertisement provider may produce an advertisement. The advertisement provider may use the Ad-ID system to generate an advertisement identifier (e.g., advertisement identifier 214a or Ad-ID) for the advertisement (e.g., advertisement 212a). Placement of the advertisement may be referenced using the advertisement identifier. The advertiser may omit generating a new advertisement identifier for each individual insertion/placement of that advertisement. Ad-ID and/or other identification registry organizations may charge a fee to generate advertisement identifiers, so generating more than one advertisement identifier per advertisement to identify each advertisement placement may be cost prohibitive. For example, an advertisement identifier for A1 and A2 may be the same.

Multiple advertisements having the same advertisement identifier may cause problems for a media playback client (e.g., client 250). For example, if the same advertisement is placed more than once in a presentation, then the multiple placements of the same advertisement may result in multiple periods that may have the same or equivalent descriptor elements. Upon determining that the multiple periods have the same or equivalent descriptor elements, a media playback client may interpret that the multiple placements of the same advertisement may be continuations of a single advertisement. The media playback client may not be capable of correctly switching context between the main video content (e.g., periods M1, M2 and M3) and the multiple placements of the same advertisement (e.g., periods A1 and A2). A media playback client may not be capable of correctly displaying the playback progress (e.g., scrub bar) when playing the various placements of the same advertisement (e.g., when playing A2). A media playback client may not be capable of correctly processing trick mode operations (e.g., fast forward, reverse playback, or seek) when playing the various placements of the same advertisement (e.g., when playing A2).

Figure 5:
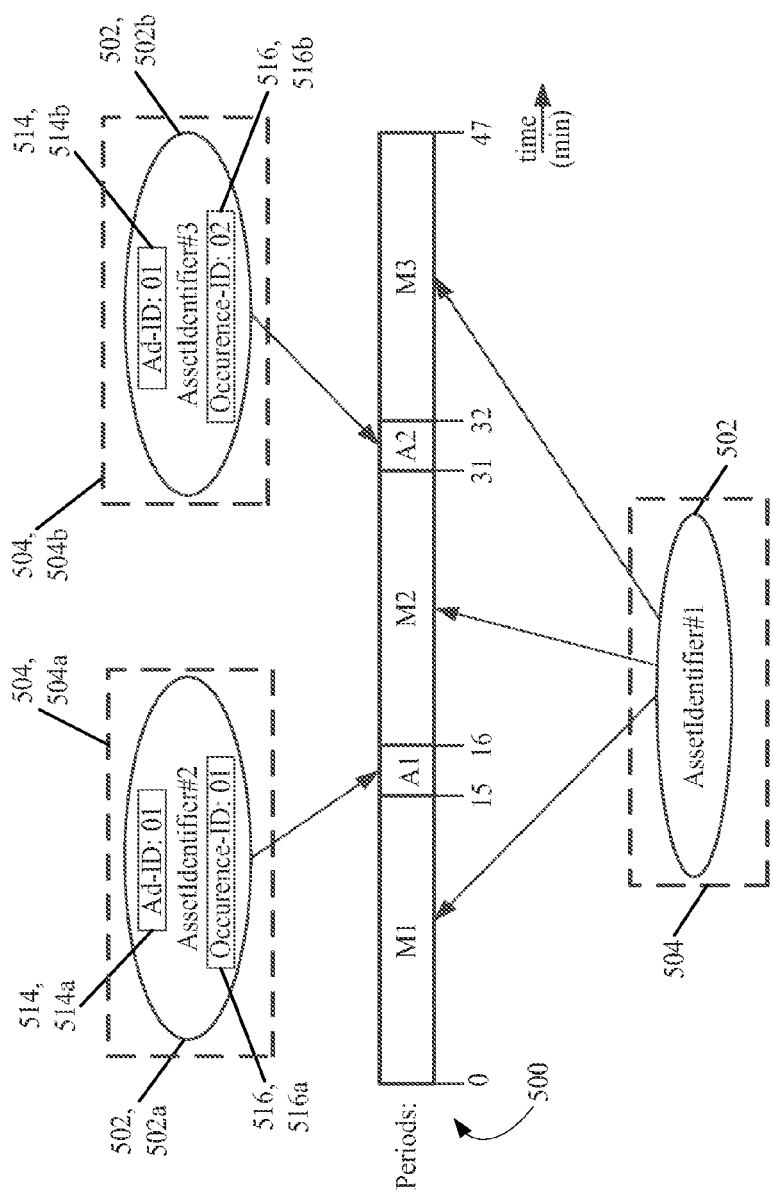
FIG. 5 illustrates an example case where multiple inserted advertisement objects may be insertions of the same advertisement object.

FIG. 5 illustrates an example media stream 500. The media stream 500 may include periods M1, M2 and M3. The periods M1, M2 and M3 may belong to a non-advertising media content (e.g., media content 212b, for example a movie). The media stream 500 may include advertisement periods A1 and A2. The advertisement periods A1 and A2 may be representative of an advertisement (e.g., advertisement 212a). The advertisement period A2 may be a repetition of the advertisement period A1 (e.g., the advertisement period A1 and the advertisement period A2 may be for the same advertisement). Descriptor elements 502 (e.g., AssetIdentifier descriptor elements) may be included in one or more of the periods M1, M2, M3, A1 and A2. For example, a period (e.g., each period) may include one or more descriptor elements. One or more descriptor elements may be included in a media presentation description (MPD), a period, an AdaptationSet, and/or a Representation element. A descriptor element may include a uniform resource identifier (URI) that may identify a scheme of the descriptor element (e.g., what the descriptor element does). A descriptor element may comprise a single string value, an XML element, and/or the like. For example, the MPD 504 may comprise one or more descriptor elements 502.

A first descriptor element 502a may be used for a first occurrence of an advertisement, for example, A1. A second descriptor elements 502b may be used for a second (e.g., repeat) occurrence of the advertisement, for example, A2. The descriptor elements 502a and 502b may be included in the same MPD, for example, MPD 504. The descriptor elements 502a and 502b may be included in different versions of a MPD. For example, the first descriptor element 502a may be included in a first version 504a of the MPD 504. The second descriptor element 502b may be included in a second version 504b of the MPD 504.

The descriptor elements 502 and 502b may include an advertisement identifier 514. The first descriptor element 502a may include a first advertisement identifier 514a that may identify the advertisement A1. The second descriptor element 502b may include a second advertisement identifier 514b that may identify the advertisement A2. The first advertisement identifier 514a and the second advertisement identifier 514b may refer to the same advertisement. The first advertisement identifier 514a and the second advertisement identifier 514b may the same or equivalent. As illustrated, the first advertisement identifier 514a and the second advertisement identifier 514b refer to an advertisement with an Ad-ID of '01'.

A media playback client may erroneously determine that descriptor elements corresponding with A1 and A2 are equivalent, for example because the descriptor elements include the same advertisement identifiers. The media playback client may erroneously determine A2 to be a continuation of A1, for example because it may have determined that their corresponding descriptor elements are equivalent. The media playback client may play A2 midway through and not from a beginning of the advertisement to which A2 refers. The media playback client may not display the progress bar correctly, for example, because it may have erroneously determined that A2 is a continuation of A1. The media playback client may not allow trick mode operations (e.g., fast forward, rewind, etc.) during the presentation of A2, for example, because it may have erroneously determined that A2 is a continuation of A1.

A descriptor element 502 may indicate an occurrence(s) (e.g., a repeat occurrence) of corresponding media content (e.g., advertisements). Indicating a repeat occurrence of a media content may enable a media playback client to present the repeat occurrence of the media content from a beginning of the media content. Indicating the repeat occurrence may prevent the media playback client from erroneously playing the media content from midway. Indicating the repeat occurrence may enable the media playback client to correctly display the progress bar. Indicating the repeat occurrence may enable the media playback client to allow trick mode operations during the presentation of the repeat occurrence. The media playback client may determine that the repeat occurrence is not a continuation of a previous occurrence, for example, because of a repeat occurrence indication in a descriptor element corresponding with the repeat occurrence.

A descriptor element 502 may comprise an occurrence identifier 516. The occurrence identifier 516 may specify an occurrence of the advertisement. The occurrence identifier 516 may be included in a field or a subfield of a descriptor elements 502, for example an id field or a value field. For example, a first occurrence identifier 516a may specify that A1 is a first occurrence of an advertisement (e.g., Ad-ID: 01) in the media stream 500. A second occurrence identifier 516b may specify that A2 is a second (e.g., repeat) occurrence of the same advertisement (e.g., Ad-ID: 01) in the media stream 500. As illustrated in the example of FIG. 5, the first occurrence identifier 516a refers to an Occurrence-ID of '01', for example to specify that A1 is the first occurrence of an advertisement in the media stream 500. The second occurrence identifier 516b refers to an Occurrence-ID of '02', for example to specify that A2 is a second occurrence of the same advertisement in the media stream 500.

A media playback client (e.g., DASH client, client 250, and/or the like) may receive one or more descriptor elements 502. The media playback client may determine that the first descriptor element 502a and the second descriptor element 502 are different (e.g., not equivalent), for example because the occurrence identifiers 516a and 516b are different. The media playback client may determine that A2 is not a continuation of A1. The media playback client may determine that A2 is a repeat occurrence of A1. The media playback client may present (e.g., play) the repeat occurrence of the advertisement (e.g., A2) from a beginning of the advertisement. The media playback client may correctly display the playback progress bar (e.g., scrub bar) during the playback of A2, for example because it has determined to play A2 from its beginning. The media playback client may correctly process trick mode operations (e.g., fast forward, reverse playback, or seek), for example because it has determined that A2 is not a continuation of A1.

A network entity may modify one of the descriptor elements 502a and 502b, for example, to ensure that a media playback client determines that the descriptor elements 502a and 502b are different. The network entity may include a repetition indicia in the descriptor element that corresponds with a repeat occurrence of an advertisement. The network entity may not include the occurrence identifier 516a in the first descriptor element 502a, for example if the network entity includes the repetition indicia in the second descriptor element 502b. The media playback client may determine that A2 is not a continuation of A1, for example if the second descriptor element 502b includes the repetition indicia even if the first descriptor element 502a may not include the first occurrence identifier 516a. For example, the second descriptor element 502b may include 'r' in an id field to indicate that A2 is a repeat occurrence and not a continuation of A1. An example of the repetition indicia is the second content identifier 516b.

Tracking ad impressions may require reporting of playback of 25%, 50% and/or 75% of the ad. In other words, tracking ad impressions may require callbacks synchronized to media timeline. Ad impressions may be tracked by logging HTTP GET requests or through VAST.

While HTTP GET tracking may be efficient. HTTP GET tracking does not ensure that a downloaded segment was ever scheduled to be played. Aggregating request logs from different Content Delivery Nodes (CDN) and associating the request logs with a specific session may be computationally expensive. Use of generic URL parameters may simplify the aggregation by allowing a unique session identifier in the segment request. The session identifier may be assigned when the MPD is fetched or at the beginning of a period.

Tracking ad impressions through VAST may be simpler than HTTP GET. However, VAST may require a relatively complex non-DASH entity. VAST tracking may use the same URLs included in the MPD and identifying sessions may require unique MPDs for each session.

While HTTP GET and VAST may enable the tracking of ad impressions to some extent, it may not be possible to report information generated on the client side. Client-side reporting may not be possible because HTTP GET and VAST may not allow sending information such as client location (e.g., GPS coordinates), playout state (e.g., fast forward, rewind, etc.), face detection results, social network information, etc.

An element may be added to a descriptor element (e.g., descriptor element 502), for example, to report correct advertisement identifiers and/or have correct playback function under media content repetition (e.g., under multiple occurrences of the same advertisement in a media presentation, for example A1 and A2 in media stream 500). The underlying media content identifier (e.g., media content identifier 514, advertisement identifier 214a, etc.) may be the same for identical media content (e.g., A1 and A2). An occurrence identifier 516 (e.g., advertisement placement string) may be included in one of the attributes of the descriptor element 502 and/or in the payload of the descriptor element 502.

The occurrence identifier 516 may allow multiple occurrences of the same advertisement to have different or non-equivalent descriptor elements 502a and 502b. The occurrence identifier 516 may be generated by a back-end device or network component (e.g., content provider 210). The network component may provide or generate the descriptor elements 502a and 502b for advertisement content A1 and A2. For example, the descriptor elements 502a and 502b including the occurrence identifiers 516 may be generated or provided by a content encoder, a content packager, an HTTP server, an HTTP proxy, an origin server, a CDN node, or a similar component. The descriptor elements 502a and 502b, which may include the occurrence identifiers 516, may be returned by an XLink resolver in the process of returning advertisement period elements to a video playback client.

The occurrence identifier 516 may be carried in an attribute of the descriptor elements 502a and 502b. For example, the occurrence identifier 516 may be carried in an id attribute, as follows:
<AssetIdentifier schemeIdUri="urn:org:dashif:ad-id:2013"
value="md:cid:EIDR:10.5240%2fF592-58D1-A4D9-E968-5435-L"
id="2905e3a2-dee1-46a2-ac0b-98526e45a27b"/>

A media stream may have multiple occurrences of an advertisement that may have the same advertisement identifier (e.g., content identifier 514 or advertisement identifier 214a). Each occurrence of an advertisement may have a different advertisement occurrence identifier (e.g., occurrence identifier 516) that may be stored in an id attribute. For example, the descriptor elements 502a and 502b for the multiple occurrences of the same advertisement may not be equivalent due to the different advertisement occurrence identifiers (e.g., occurrence identifiers 516a and 516b).

An advertisement occurrence identifier (e.g., occurrence identifier 516) may be carried in a payload or a content area of the descriptor element. For example, it may be the string "2905e3a2-dee1-46a2-ac0b-98526c45a27b" (e.g., which may be a UUID), for example, as shown in the following example:
    <AssetIdentifier schemeIdUri="urn:org:dashif:ad-id:2013"
      value="md:cid:EIDR:10.5240%2fF592-58D1-A4D9-E968-5435-L">
      2905e3a2-dee1-46a2-ac0b-98526e45a27b
    </AssetIdentifier>

An advertisement occurrence identifier (e.g., occurrence identifier 516) may be in the form of a date and/or time field. For example, the date and/or time of the generation of the descriptor elements 502a and 502b may be used. The expected playout date and/or time of the advertisement may be used. The date and/or time may be carried in an attribute (e.g., date) of the descriptor elements 502a and 502b. As shown in the following example, the date and/or time may be carried in the payload or content of the descriptor element 502a and 502b.
    AssetIdentifier schemeIdUri="urn:org:dashif:ad-id:2013"
      value="md:cid:EIDR:10.5240%2fF592-58D1-A4D9-E968-5435-L"
      id="ad-server1.adsrus.com">
      2013-11-25T08:15:30-05:00
    </AssetIdentifier>

A media stream (e.g., media stream 500) may have multiple occurrences of an advertisement that may have the same advertisement identifier (e.g., media content identifier 514) for the advertisement. Each advertisement occurrence may have a different date and/or time field (e.g., as carried in an attribute, or in the payload or content). The descriptor elements 502a and 502b for the multiple occurrences of the same advertisement may not be equivalent due to the different advertisement occurrence identifiers (e.g., occurrence identifiers 516a and 516b).

A system for inserting advertisements may include a first network component that may generate a MPD for delivery to a media playback client (e.g., client 250). A second network component may generate descriptor elements (e.g., descriptor elements 502a and 502b) that may be inserted in the MPD (e.g., MPD 504). The second network component may take any of a variety of forms, such as, for example, a packager, an encoder, an HTTP Server, an HTTP Proxy, and/or the like. The second network component may insert the descriptor elements 502a and 502b in the MPD 504 before the MPD 504 may be delivered to the media playback client (e.g., client 250). The descriptor elements may be inserted in the MPD in response to a request, for example to resolve the descriptor elements. The request may be made by the media playback client (e.g., client 250), for example to an Xlink Resolver component.

A media playback client (e.g., client 250) may experience problems when presenting dynamic or live content (e.g., a live sports broadcast). When dynamic content is presented the MPD may be updated during the presentation. For example, the MPD may be updated periodically. Updating the MPD during the presentation may lead to different versions of the same MPD being valid at different times. Consequently, period elements that are present in a particular MPD version may not be present in later MPD versions. For example, period elements that are in version 1 of the MPD may not be in version 2.

Figure 6:
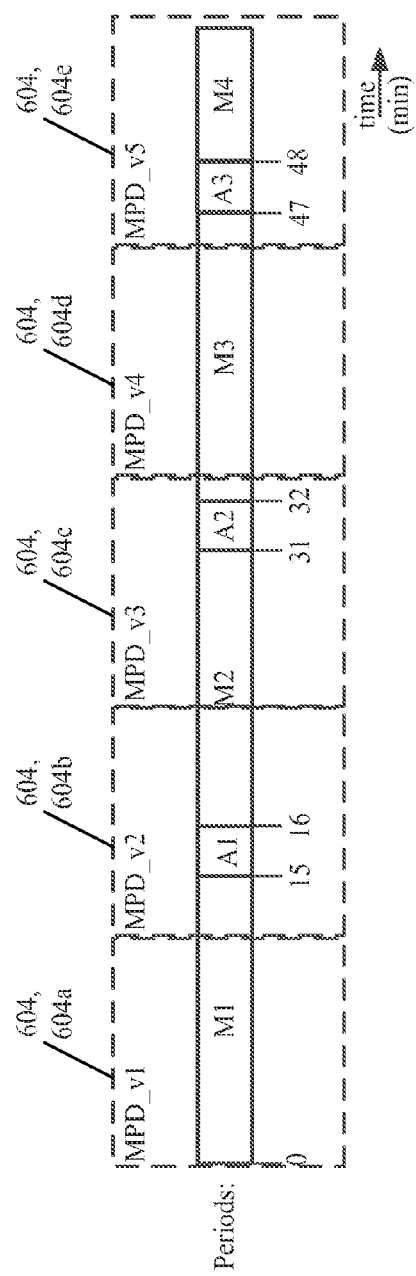
FIG. 6 illustrates an example presentation of media periods and advertisements for a dynamic asset with MPDs that vary over time.

As illustrated in FIG. 6, a MPD file 604 may include one or more versions. For example, the MPD file 604 may include a first version 604a, a second version 604b, a third version 604c, a fourth version 604d and a fifth version 604e. The MPD file 604 may be updated (e.g., periodically). A newer version of the MPD that is valid after the 30th minute mark may not include period M1. For example, the third version 604c may not include period M1. A media playback client may not be able to display that period M2 starts at the 15th minute mark. As illustrated, period M4 may start at the $48^{th}$ minute mark. The fifth version 604e of the MPD 604 may be valid when the period M4 is presented and all previous versions 604a, 604b, 604c and 604d of the MPD 604 may be invalid. Since the fifth version 604e of the MPD 604 may not include periods M1 and M2, the playback progress bar may display incorrect information. For example, the playback progress bar may show that period M4 started at the $2^{nd}$ minute mark of the content, whereas period M4 may actually have started at the $48^{th}$ minute mark.

A media content time (e.g., an asset time) may be indicated, for example, as described herein. The media content time may indicate a time at which the media content started. The media content time may indicate a time at which the media content is expected to end. The media content time may indicate a time duration of the media content. The media content time may be indicated in a MPD, for example the MPD file 604. The media content time may be indicated in a first version of the MPD, for example the first version 604a. The media content time may be indicated by a last version of a MPD, for example fifth version 604e. The media content time may be indicated by each version of a MPD, for example versions 604a-604e. The media content time may be included in a descriptor element, for example an AssetIdentifier descriptor element, a SupplementalProperty descriptor element, etc.

A media playback client may receive a MPD. The MPD may indicate a media content time, for example a time at which the media content started. The media playback client may determine a playback position of the media content based on the media content time. For example, the media playback client may correctly determine that period M4 starts at the $48^{th}$ minute murk based on a media content start time included in the fifth version 604e. The media playback client may correctly display that period M4 starts at the $48^{th}$ minute mark even though the current version of the MPD may not include previous periods.

A media playback client may preserve resources for a media content (e.g., each media content). Media playback clients may be prone to excessive resource consumption. For example, a 24/7 broadcast channel that shows drama may show different media content throughout the day. Media playback clients may stay tuned and may maintain states for a media content even after the media content has been presented. The amount of resources consumed by the media playback client may continue increasing. Example states that a media playback client may maintain include playout buffers, decoder memory, state variables, etc.

Figure 7A:
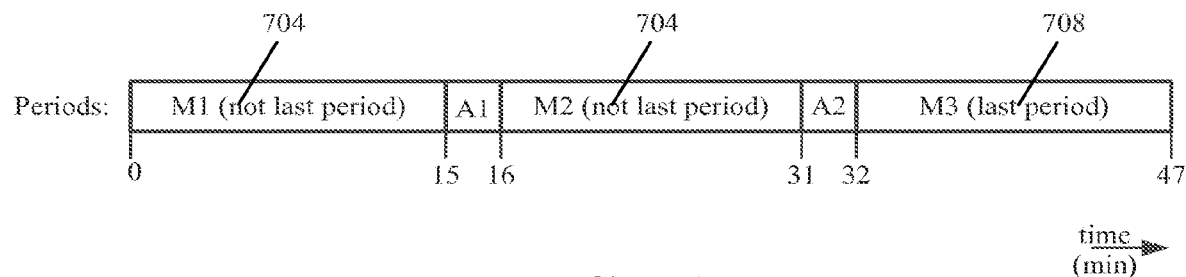
FIG. 7A-C illustrate example media periods that indicate the last period of an asset.
Figure 7B:
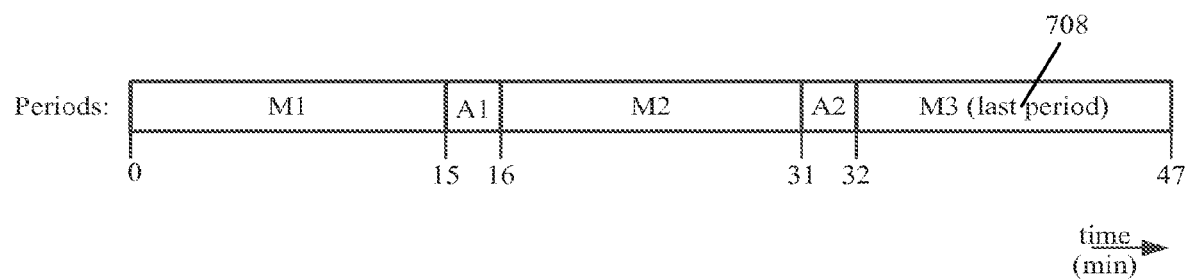
Figure 7C:
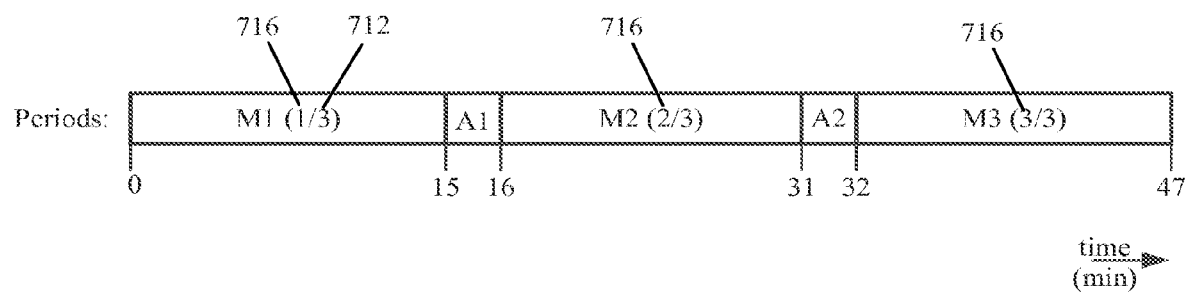

Indicating the last period of a media content may prevent, or at least reduce, excessive resource consumption by a media playback client. At least one period (e.g., each period) of a media content may include indicia indicating the last period of the media content. As illustrated in FIG. 7A, each period may indicated whether it is the last period of the media content. For example, periods M1 and M2 may include a continuation indicia 704 that may indicate that the media content continues with a subsequent period(s). Period M3 may include a last period indicia 708 that may indicate that it is the last period. As shown in FIG. 7B, the last period M3 may include the last period indicia 708 that may indicate that it is the last period of the media content. Other periods M1 and M2 may not include an indicia. As shown in FIG. 7C, the first period M1 may include a period count indicia 712 that may indicate the total number of periods in the media content. Other periods (e.g., each period) may include a counter 716 that may indicate the number of periods remaining or the number of periods already presented. The indicia 704 or 708 may be inserted in a MPD (e.g., MPD 404, 504 or 604) by a network entity (e.g., content provider 210).

Figure 8:
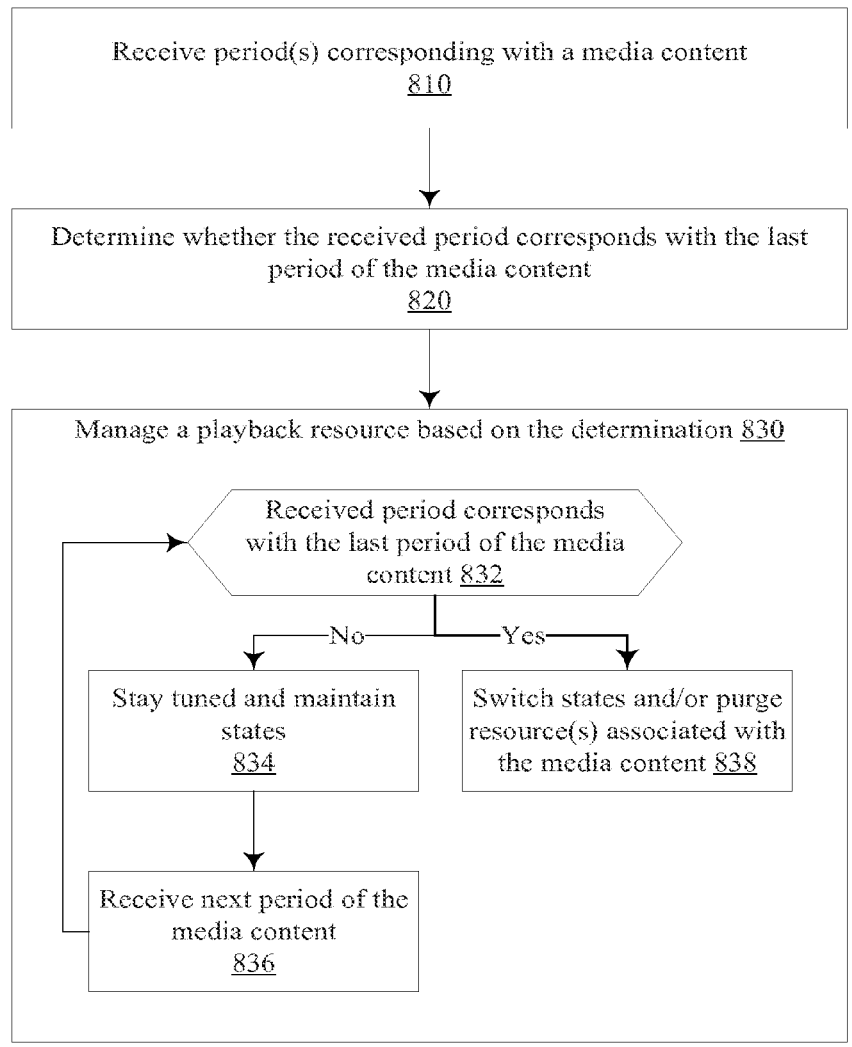
FIG. 8 illustrates an example arrangement of operations for managing resources when presenting a dynamic asset.

As illustrated in FIG. 8, a media playback client (e.g., client 250) may be configured for one or more of the following. At 810, a media playback client may receive periods (e.g., periods M1, M2 and M3). The media playback client may receive periods from a network entity, for example the content provider 210. At 820, the media playback client may determine whether a current period is the last period of a media content. The media playback client may determine whether the current period is the last period by scanning the current period, for example for indicia that indicates that the current period is the last period. For example, the media playback client may scan for the last period indicia 708. The media playback client may determine that the current period is the last period, e.g., if it finds the last period indicia 708 in the current period. The media playback client may determine that a period is not the last period, for example by identifying a continuation indicia 704 in the current period or by not finding the last period indicia 708. The media playback client may determine the last period by counting the number of periods received and identifying the last period, for example based on the period count indicia 712.

At 830, the media playback client may manage a playback resource (e.g., playback buffer(s), decoder memory, state variable(s), etc.) based on the determination. Managing a playback resource may include one or more of the following. At 832, the media playback client may determine whether a current period is the last period of the media content. This determination may be made as described above. At 834, the media playback client may stay tuned and/or maintain a playback resource, e.g., if the current period is not the last period. For example, the media playback client may continue maintaining a playback buffer(s) associated with the media content, a portion of the decoder memory associated with the media content, and/or a state variable(s) associated with the media content. The media playback client may receive another period, at 836.

At 838, the media playback client may switch playback states, for example after playing the last period of the media content. The media playback client may cease maintaining a playback resource (e.g., playback buffer(s), decoder memory, or state variable(s), etc.). The media playback client may purge a playback resource, for example after (e.g., immediately after) playing the last period of the media content. The media playback client may purge a playback buffer(s) associated with the media content. The media playback client may purge a memory (e.g., a portion of the decoder memory) associated with the media content, for example after (e.g., immediately after) the last period has been played. The media playback client may determine the last period of the media content based on an indicia included in at least one of the periods, for example the continuation indicia 704, the last period indicia 708 and/or the period count indicia 712.

EIDR may be used as an identification for the media content. Ad-ID may be used for cross-platform identification of advertising assets. A simpler, but less versatile, method of integration, may involve defining two different asset (e.g., media content) identifier schemes. One asset (e.g., media content) identifier scheme may be used for advertising content, e.g., Ad-ID. Another asset (e.g., media content) identifier scheme may be used for main content, e.g., EIDR. EIDR may be used for tracking and reporting, for example.

MPD events may be used to provide per-period annotation that may be used by the application layer. VAST may be supported by multiple vendors' servers. A tracking module that may use VAST tracking elements may allow easy integration. A VAST response, or part of a VAST response, may be included in an MPD event.

In a server-based workflow, the XLink resolver may receive a response from the advertising decision server that may include VAST tracking elements. These tracking elements may include a URL for a resource that may be accessed using an HTTP GET request given a specific event (e.g., the advertisement started playing, 25% of the advertisement was played out, etc.). This resource may be, for example, a 1×1 transparent pixel image. The elements may be wrapped into an MPD event within a period element in the XLink resolver response. When dereferencing is finished, the DASH client may pass the tracking elements to an external VAST-processing module.

VAST may be integrated and used for tracking and reporting impressions. Certified events may be more valuable to an advertiser relative to uncertified events. In order to distinguish between certified and uncertified events, additional VAST events may be defined. Fragment or query parameters may be appended to the tracking URLs.

In some cases, an uplink may be significantly more expensive than a downlink (e.g., DASH over electronic Multimedia Broadcast Multicast Service (eMBMS)). Multiple impression reports may be aggregated. The same HTTP GET requests may be issued when they become available. A combined report may be sent when uplink use is feasible. There may be an interoperable way of sending a combined report.

The content of a descriptor element (e.g., AssetIdentifier descriptor element) may be used for tracking and reporting purposes. Identification schemes such as Ad-ID may be used. The content of the descriptor element may be used to provide information regarding the advertising server response. The content of a descriptor element may be an Ad element that may be defined in the VAST specification.

One or more generic descriptor elements at the period level or AdaptationSet level may be used to indicate a position of a specific period (e.g. the last period) within a media content (e.g., asset). The descriptor element(s) may indicate whether saving resources for the media content is possible and/or useful. A descriptor element (e.g., supplemental property descriptor element, for example SupplementalProperty) may indicate a time within the media content corresponding to an earliest playout time of this period. The descriptor element may indicate an expected length of the media content. The descriptor element may indicate whether more periods from the media content are expected, for example, as shown in the following example.

```xml
<!-- Movie -->
<Period duration="PT600S" id="movie period #1">
    <SupplementalProperty
    schemeIdUri="urn:org:example:to-be-continued"/>
    <AssetIdentifier schemeIdUri="urn:org:dashif:asset-id:2013"
        value="md:cid:EIDR:10.5240%2fF592-58D1-A4D9-E968-5435-L"/>
    [...]
</Period>
<!--Movie, cont'd -->
<Period duration="PT600S" id="movie period #2">
    <AssetIdentifier schemeIdUri="urn:org:dashif:asset-id:2013"
        value="md:cid:EIDR:10.5240%2fF592-58D1-A4D9-E968-5435-L"/>
    <SupplementalProperty schemeIdUri="urn:org:example:asset-time"
        value="00:10:00/00:42:42"/>
    [...]
</Period>
<!--Movie, end -->
<Period duration="PT1320S" id="movie period #3">
    <AssetIdentifier schemeIdUri="urn:org:dashif:asset-id:2013"
        value="md:cid:EIDR:10.5240%2fF592-58D1-A4D9-E968-5435-L"/>
    <SupplementalProperty schemeIdUri="urn:org:example:end-of-asset"/>
    <SupplementalProperty schemeIdUri="urn:org:example:asset-time"
        value="00:20:00/00:42:42"/>
    [...]
</Period>
```

A descriptor element (e.g., SupplementalProperty) may be used to indicate the last period of a media content, for example, as described herein. A descriptor element (e.g., "urn:org:example") may indicate that a current period is not the last period of a given media content, e.g., "urn:org:example:to-be-continued". The descriptor element may indicate that other periods may be expected. The descriptor element may indicate that the current period is the last period of a given media content, for example by including "urn:org:example:end-of-asset". The descriptor element may indicate that other periods are not expected for the media content.

The media playback client (e.g., MPEG-DASH client or client 250) may determine whether the current period is the last period, e.g., by determining whether the current period includes a SupplementalProperty descriptor element. For example, the media playback client may determine that the current period is the last period by identifying an "end-of-asset" descriptor in the current period. The media playback client may determine that the current period is not the last period, e.g., when the current period does not include an "end-of-asset" descriptor.

A descriptor element may store one or more values that may indicate a time within a media content at which the new period starts and/or the total expected length of the media content. In the above example, the third period may include a SupplementaryProperty descriptor ("urn:org:example:asset-time") with a value field that indicates that the third period starts at time 00:20:00 (twenty minutes) within the media content. The value field may further indicate that the total expected length of the media content is 00:42:42 (forty-two minutes and forty-two seconds).

Figure 9A:
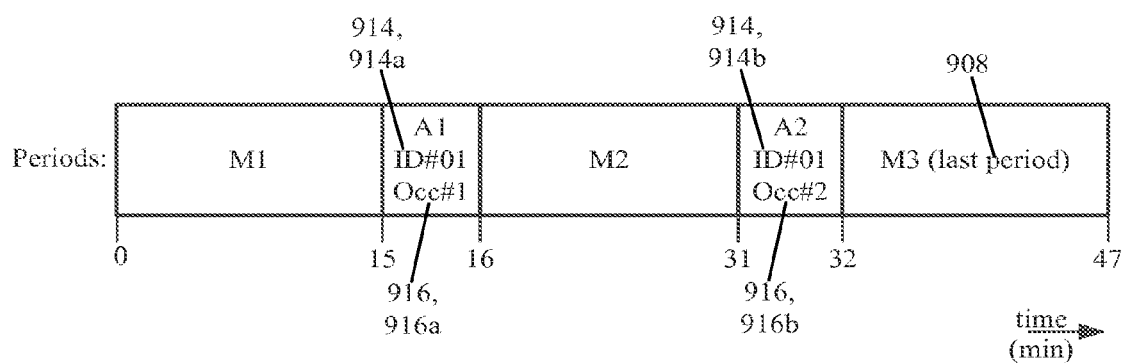
FIG. 9A-B illustrate an example presentation of media periods and repeated advertisements.

As shown in FIG. 9A, a media playback client may receive periods M1, M2 and M3 associated with a media content (e.g., a movie). The media playback client may receive advertisements A1 and A2. The advertisements A1 and A2 may include an advertisement identifier 914 that may identify the advertisement. Advertisement identifiers 914a and 914b may be the same, e.g., when advertisements A1 and A2 are the same (e.g., identical). The advertisements A1 and A2 may include occurrence identifiers 916 that may indicate the occurrence of the advertisement. The occurrence identifiers 916 may be included in a descriptor element (e.g., SupplementalProperty). Advertisement A1 may include a first occurrence identifier 916a that may indicate that A1 is the first occurrence of an advertisement that may be referred to by ID#01. Advertisement A2 may include a second occurrence identifier 916b that may indicate that A2 is the second occurrence of the advertisement that may be referred to by ID#01.

A media playback client (e.g., client 250) may be configured for one or more of the following. The media playback client may determine that A2 is a repeat of A1 and not a continuation of A1, for example, based on the occurrence identifiers 916a and 916b being different. The media playback client may present (e.g., play) A2 from a beginning and not midway. A repeat occurrence (e.g., only a repeat occurrence) of an advertisement may include an occurrence identifier and an initial occurrence of the advertisement may not include the occurrence identifier. For example, A2 (e.g., only A2) may include the occurrence identifier 916 and A1 may not include the occurrence identifier 916.

Figure 9B:
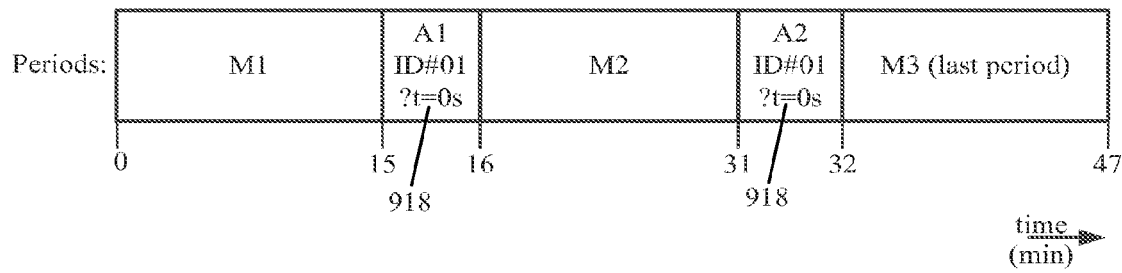

As shown in FIG. 9B, the advertisements A1 and A2 may include a playback pointer 918 that may indicate a time within the advertisements from where the media playback client may play the advertisement. For example, '?t=0s' may indicate that the media playback client may present the advertisement A2 from the beginning. The playback pointer 918 may be included in a descriptor element (e.g., SupplementalProperty). The media playback client may receive the advertisement A2. The media playback client may identify a playback pointer within the advertisement A2 and/or play the advertisement A2 from the playback pointer 918. By including a playback pointer 918 that points to the beginning of advertisement A2, the media playback client may be enabled to play the advertisement A2 from the beginning and not midway. A repeat occurrence (e.g., only a repeat occurrence) of an advertisement may include a playback pointer and an initial occurrence of the advertisement may not include the playback pointer. For example, A2 (e.g., only A2) may include the playback pointer 918 and A1 may not include the playback pointer 918.

The mechanism of MPD events may be used in conjunction with generalized URL parameters to provide an extended native reporting framework. For example, a new event scheme may be registered. In the event scheme, the payload may include a URL template. The timing may indicate a time at which the video playback client may construct the URL and issue an HTTP GET to the constructed URL. The video playback client may disregard the HTTP response to the HTTP GET request. In addition to the default HTTP GET, it may be possible to use HTTP PUT or HTTP POST, for example when the event carries the HTTP method that the video playback client may use.

Use of generalized URL parameter may enable the use of new parameters computed at the client side or assigned in real-time by the server. The client-side parameters may include GPS coordinates, social network ID, information about the human viewers (e.g., number of viewers, whether device is in a person's hand or at rest, emotional response, etc.). The client-side parameters may also include information about the device and connection (e.g., device model). The server-assigned parameters may include user and session identification.

DASH events may be tied to a media timeline. However, the same model may be applied for Quality of Service (QoS) or Quality of Experience (QoE) information when an extended event model is defined for events happening in real-time during the playout. Event framework may be extended to report data associated with recurring events, for example events that occur at a certain frequency. For example, an event header or a payload may include a field describing the frequency of the event and a limit on how many times the event may be invoked or the latest time at which the event may be invoked.

The processes and instrumentalities described herein may apply in any combination, may apply to other wireless technologies, and/or for other services.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU. UE, terminal, base station, RNC, and/or any host computer.

What is claimed is:

1. A computing device, comprising:
    a processor configured to:
        identify a timing parameter synchronized to a media timeline;
        receive a Moving Picture Experts Group-Dynamic Adaptive Streaming over HTTP (MPEG-DASH) event scheme comprising a payload, the payload indicating a uniform resource locator (URL) template for enabling the computing device to respond to a MPEG-DASH callback event using at least one client-side URL parameter;
        compute the at least one client-side URL parameter;
        generate, at a first time based on the timing parameter synchronized to the media timeline, a URL based on the URL template that is received in the payload of the MPEG-DASH event scheme and the at least one computed client-side URL parameter;
        send, at a second time based on the timing parameter synchronized to the media timeline a Hypertext Transfer Protocol (HTTP) GET Request using the generated URL to respond to the MPEG-DASH callback event;
        receive a HTTP Response in response to the HTTP GET Request; and
        disregard the HTTP Response received in response to the HTTP GET Request without parsing contents of the HTTP Response.

2. The computing device of claim 1, wherein the at least one computed client-side URL parameter comprises at least one of a set of GPS coordinates, a social network ID, or viewer information.

3. The computing device of claim 2, wherein the at least one computed client-side URL parameter comprises at least one of device information or connection information.

4. The computing device of claim 1, wherein the processor is further configured to send at least one of a HTTP PUT Request and a HTTP POST Request via the URL.

5. A method of scheduling a Moving Picture Experts Group-Dynamic Adaptive Streaming over HTTP (MPEG-DASH) event, comprising:
    identifying a timing parameter synchronized to a media timeline;
    receiving a MPEG-DASH event scheme comprising a payload, the payload indicating a uniform resource locator (URL) template for enabling a computing device to respond to a MPEG-DASH callback event using at least one client-side URL parameter;
    computing the at least one client-side URL parameter;
    generating, at a first time based on the timing parameter synchronized to the media timeline, a URL based on the URL template that is received in the payload of the MPEG-DASH event scheme and the at least one computed client-side URL parameter;
    sending, at a second time based on the timing parameter synchronized to the media timeline a Hypertext Transfer Protocol (HTTP) GET Request using the generated URL to respond to the MPEG-DASH callback event;
    receiving a HTTP Response in response to the HTTP GET Request; and
    disregarding the HTTP Response received in response to the HTTP GET Request without parsing contents of the HTTP Response.

6. The method of claim 5, wherein the at least one computed client-side URL parameter comprises at least one of a set of GPS coordinates, a social network ID, or viewer information.

7. The method of claim 6, wherein the at least one computed client-side URL parameter comprises at least one of device information or connection information.

8. The method of claim 5, further comprising sending at least one of a HTTP PUT Request and a HTTP POST Request via the URL.

* * * * *